Feb. 5, 1924.

S. ROBERTS

EXTRACTOR

Filed Jan. 24, 1923

Spurgeon Roberts
INVENTOR
BY Victor J. Evans
ATTORNEY

Feb. 5, 1924.
S. ROBERTS
1,483,013
EXTRACTOR
Filed Jan. 24, 1923
2 Sheets-Sheet 2
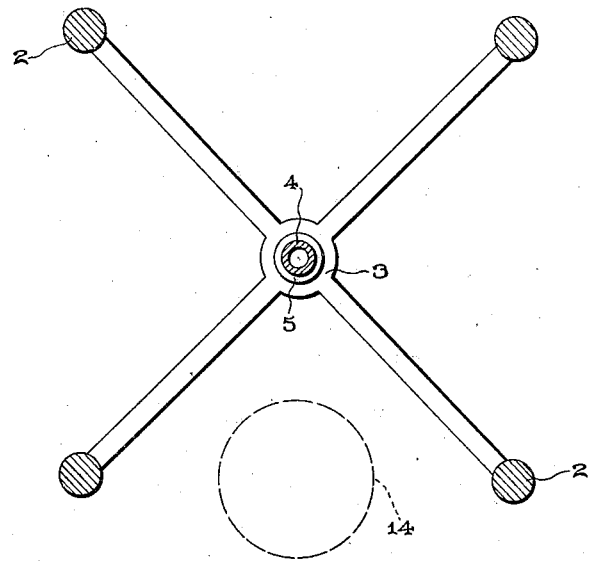
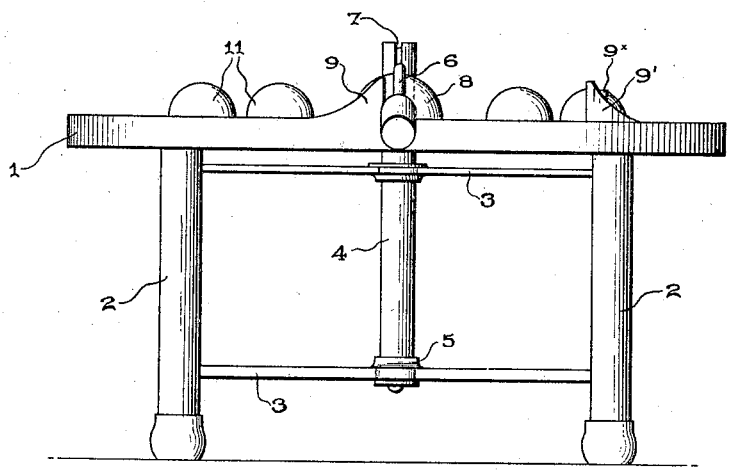
Spurgeon Roberts
INVENTOR
BY *Victor J. Evans*
ATTORNEY
H. A. LaClair
L. B. Middleton
WITNESS:

Patented Feb. 5, 1924.

1,483,013

UNITED STATES PATENT OFFICE.

SPURGEON ROBERTS, OF CORSICANA, TEXAS.

EXTRACTOR.

Application filed January 24, 1923. Serial No. 614,625.

*To all whom it may concern:*

Be it known that I, SPURGEON ROBERTS, a citizen of the United States, residing at Corsicana, in the county of Navarro and State of Texas, have invented new and useful Improvements in Extractors, of which the following is a specification.

This invention relates to a juice extractor for citrus fruits, the general object of the invention being to provide a frame which carries a disc for holding the fruit and a handle having a compression cup thereon for pressing the juice out of the fruit.

Another object of the invention is to provide means whereby the handle can be made to move the disc after the juice has been extracted from one half of the fruit to bring another half over a receptacle so that it can be engaged by the compression cup.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 3 is a horizontal section on line 2—2 of Figure 2.

Figure 4 is a side view.

Figure 1:
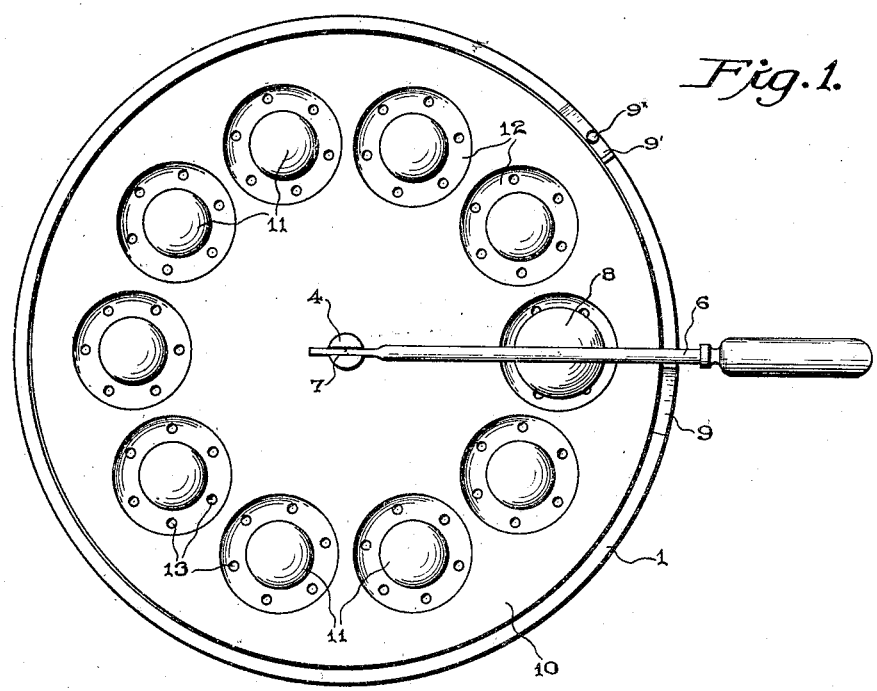
Figure 1 is a plan view of the device.
Figure 2:
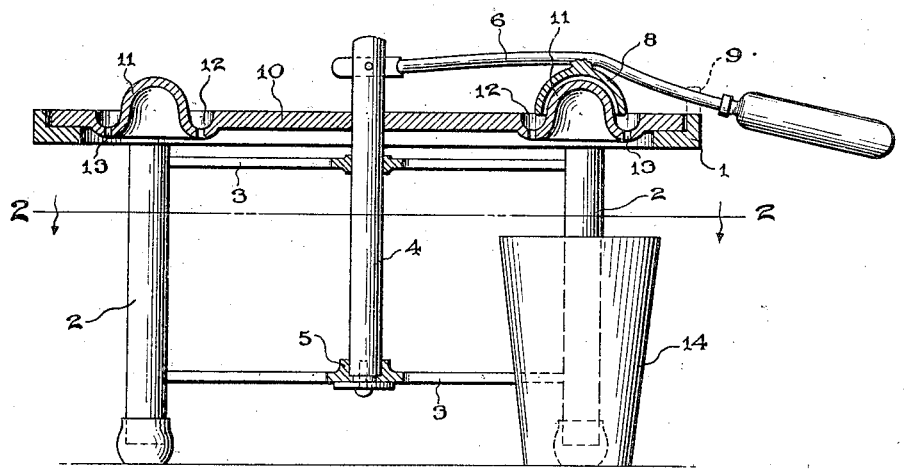
Figure 2 is a longitudinal sectional view.

In these views 1 indicates the main frame which is supported on the legs 2, said legs being connected together by the upper and lower braces 3. A vertical shaft 4 is rotatably supported by the braces, the lower end of the shaft resting in a socket 5 in the lower brace and the shaft passes through an opening in the upper brace. A handle 6 is pivoted in a socket 7 made in the upper end of the shaft so that the handle can be swung upwardly and downwardly. Said handle carries a compression cup 8. The handle can be moved horizontally, this movement being limited by the stops 9. A disc 10 is supported on the frame, said disc carrying the projections 11 for receiving the fruit, a gutter 12 surrounding the base of the projection and having perforations 13 therein for permitting the juice to pass through the disc and drop into a receptacle 14 placed under the frame.

The fruit is cut in half or portions and each portion placed on a projection. The handle is then moved over against the first projection which will place the compression cup above the receptacle 14. The disc is then turned to bring one of the projections in line with the compression cup and then the handle is lowered so as to cause the cup to engage the portion of the fruit on the projection to press the juice therefrom. After this is done the handle is moved horizontally, while still lowered, so as to move the disc to bring another projection over the cup, the stops 9 9' being so arranged as to place the second projection immediately over the cup when the handle is engaging the stop 9'. Then the handle is raised and moved back against the first stop and then lowered to press the juice from the portion of the fruit on the second projection. In this way the juice can be extracted easily and quickly from the portions of fruit placed on the disc. I prefer to make the stop 9' adjustable, as shown at $9^x$, so that the handle can be moved to different extents. For instance, it may be desired to extract the juice from portions of fruit placed on every other projection instead of every projection. This will permit the device to be used for extracting the juices from different kinds of fruit at the same time.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a frame, a disc rotatably mounted thereon, means for holding portions of fruit on the disc, a handle, a compression cup thereon and means for permitting the handle to be moved vertically in order to place the compression cup in contact with a portion of fruit on the disc to squeeze the juice therefrom and then horizontally to partially rotate the disc to bring another portion of fruit into compression position so that it can be engaged by the cup when the handle is brought back to a compression position.

2. A device of the class described comprising a frame, a disc rotatably mounted thereon, means for holding portions of fruit on the disc, a handle, a compression cup thereon, means for permitting the handle to be moved vertically in order to place the compression cup in contact with a portion of fruit on the disc to squeeze the juice therefrom and then horizontally to partially rotate the disc to bring another portion of fruit into compression position so that it can be engaged by the cup when the handle is brought back to a compression position and means for varying the extent of the horizontal movement of the handle.

3. A device of the class described comprising a frame, a vertical shaft rotatably supported thereby, a handle pivoted to the shaft so that it can be moved vertically as well as horizontally, stops for limiting the horizontal movement of the handle, a compression cup carried by the handle, a disc rotatably mounted in the frame, projections carried by the disc, a gutter surrounding each projection, said gutters having perforations therein, the disc being rotated step by step by the handle when the compression cup is in engagement with a projection, the handle being free of the disc when the cup is out of engagement with a projection or the fruit thereon.

In testimony whereof I affix my signature.

SPURGEON ROBERTS.